June 7, 1927.
F. J. MELTON
1,631,751
GRAVITY DUMP BODY FOR TRUCKS OR WAGONS
Filed July 15, 1926
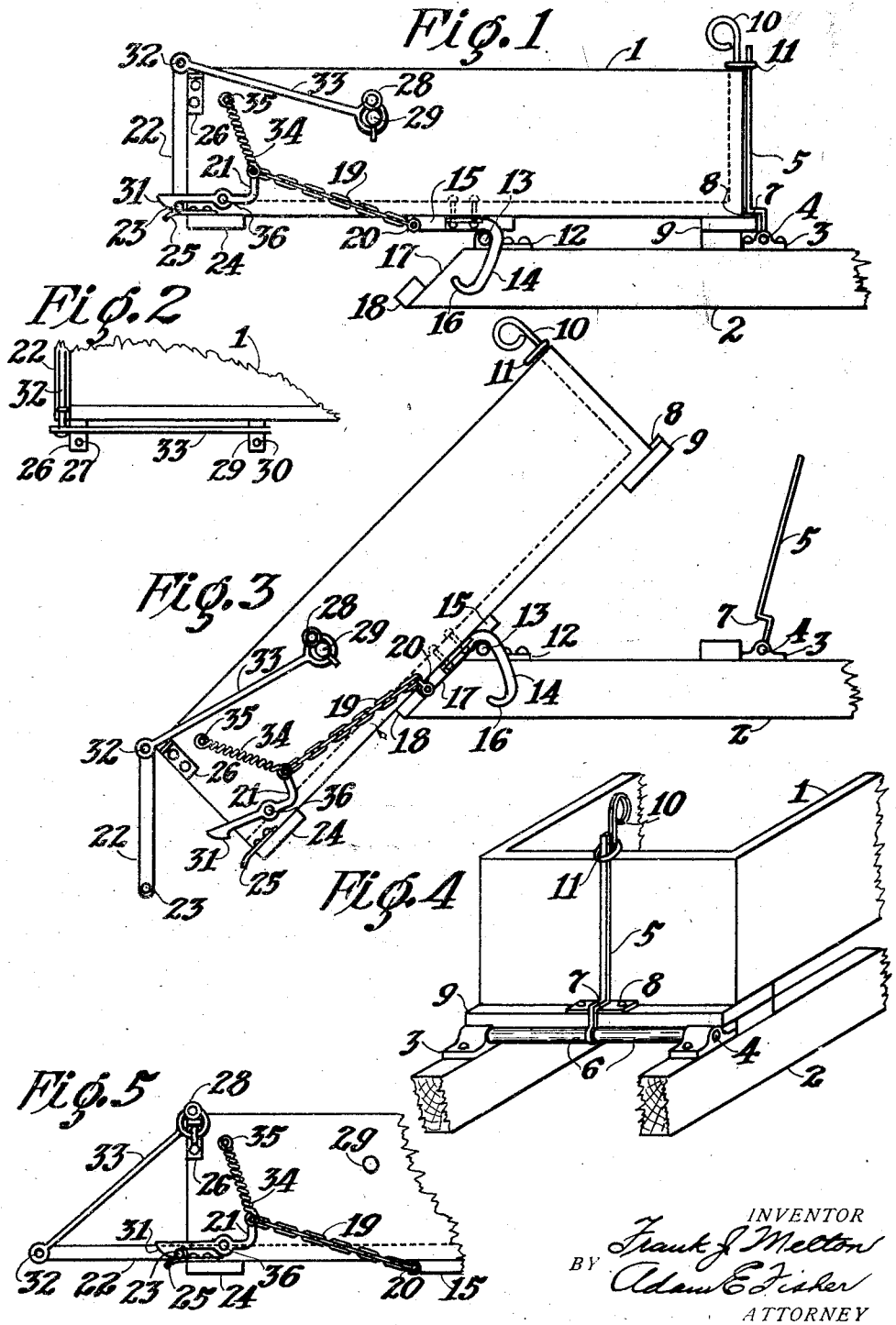

Patented June 7, 1927.

1,631,751

UNITED STATES PATENT OFFICE.

FRANK J. MELTON, OF CLAYTON, NEW MEXICO.

GRAVITY-DUMP BODY FOR TRUCKS OR WAGONS.

Application filed July 15, 1926. Serial No. 122,593.

This invention relates to a gravity truck and wagon dump and end gate, for use in that class of vehicles having a tiltable body which may be tilted for the purpose of discharging a load therefrom, and one object of my invention is to provide a simple and inexpensive means of locking said body in its normal or non-tilted condition.

Another object of the invention is to provide in a vehicle of the class described, a means of pivoting said tiltable body so as to cause its own weight to act to restrain its movement beyond the normal dumping position.

Another object of the invention is to provide in a vehicle of the class described, an end gate positioned on the body thereof, so as to permit the said end gate to restrain the load when the body is in its normal position but to automatically swing open rearwardly at the bottom when the body is tilted and thus permit the said load to be discharged therefrom.

Another object of the invention is to provide in a vehicle of the class described, a means of permitting said end gate, when it has opened rearwardly, to rise above its normal position relative to the body in order to avoid obstructions in its path.

Another object of the invention is to provide in a vehicle of the class described, a simple means of permitting said end gate to swing open rearwardly at the top so as to be positioned flush with the floor of the body.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of my invention.

In the accompanying drawings

Figure 1 represents a side elevation of a tiltable wagon body in its normal position;

Figure 2 is a partial plan view of the rear corner portion of the said body;

Figure 3 is a side elevation showing the body in a tilted position;

Figure 4 is a perspective view of the forward end of said body showing the latch mechanism;

Figure 5 is a side elevation of the rearward part of said body in its normal position showing the end board opened rearwardly at the top and positioned flush with the floor of the body.

In the embodiment illustrated, a wagon box 1 is shown mounted on the frame 2 of the vehicle on which it is intended to be used. The frame 2 has affixed thereto the brackets 3 supporting the shaft 4 therein. Rotatably mounted on the shaft 4 is the latch bar 5 which is held in an intermediate position on the shaft 4 by two pieces of gas pipe 6 of requisite diameter and length. The latch bar 5 has a rearwardly projecting surface 7 which engages the strike plate 8 affixed to the bolster 9 which is attached to the body 1 and made a part thereof, thus causing the body 1 to be restrained in its normal position. At the top of the body 1 and extending upwardly therefrom is the post 10 which is so positioned as to be in juxtaposition to the upwardly extending end of the latch bar 5 when the body 1 is in its normal position. Slidably engaging the post 10 is the ring 11 so that the said ring, when the body is in its normal position, may be slipped over the upwardly extending end of the latch bar 5 so as to restrain the said latch bar 5 in its engagement with the strike plate 8.

Also affixed to the frame 2 are the brackets 12 supporting the shaft 13 therein, said shaft 13 projecting beyond both sides of the frame 2 suitably to engage the hasp 14 which is affixed to the bolster 15, which is attached to the body 1 and made a part thereof, said hasp 14 being so constructed as to project downwardly at right angles to the body 1 a requisite distance substantially in the manner illustrated and having at its lower end an upwardly curving finger 16 such as to engage the aforementioned projecting ends of the shaft 13.

The shaft 13 is positioned on the frame 2 and the hasp 14 is positioned on the body 1 so that when the said shaft 13 is in juxtaposition to the hasp 14 in the manner illustrated the center of gravity of the body will lie in a plane rearwardly from the shaft 13.

The rearward portion of the frame 2 is fashioned so as to have its top surface 17 at an angle sloping downwardly and to the rear corresponding to the desired slope of the floor of the body 1 when said body is in the tilted position and tilted about the shaft 13 as a fulcrum by reason of the engagement of said shaft 13 with the hasp 14, in which said tilted position of the body 1 the rearwardly extending portion of the bolster 15 rests substantially on the aforesaid downwardly and rearwardly extending surface 17, but if the movement acquired by the body 1 when in the act of tilting is sufficient to carry the body beyond the aforesaid desired slope then the end of the bolster 15 will engage the side of the bolster 18 so as to cause the body 1 to fulcrum substantially about the bolster 18, said bolster 18 being positioned on the frame 2 at a point rearwardly from the center of gravity of the body 1, so that the action of gravity will cause the body 1 to return to the aforesaid desired slope and remain at rest substantially on the surface 17.

The bolster 18 projects beyond both sides of the body 1 so as to engage with the chain 19 when the body 1 is in the tilted position, one end of said chain 19 being affixed to the eye 20 attached to the bolster 15 and the other end being affixed to one arm of the bell crank 21 fulcrumed about the pin 36, which is designed to operate as a latch for securing the end gate 22 in a manner hereinafter described, and having provided on the other arm for this purpose a finger 31 to engage the bar 23 on the end gate 22 when in the closed position. Affixed to the rear end of the body 1 and having its rearward side coinciding with the rear termination of the said body 1 is the bolster 24 which projects beyond both sides of the body 1 as is usual in such construction, said bolster 24 having affixed to its upper side the fingers 25 having their rearward ends curved downward as shown and projecting rearward beyond the termination of the body 1 so as to engage the bar 23 between the said fingers 25 and the bell crank 21.

Affixed to the upper side and rear portion of the body 1 is the strap 26 having at its upper end right angularly turned outwardly and having therein a hole 27 of suitable dimensions to receive the key 28. In front of and slightly below the strap 26 is the pin 29 having also a hole 30 of suitable dimensions to receive the key 28.

In the operation of my invention, when the operator desires to tilt the body 1, the ring 11 is lifted so as to release the latch bar 5, which is then moved forward fulcruming about the shaft 4 so as to cause the disengagement of the surface 7 from the strike plate 8, thereby permitting the action of gravity to cause the body 1 to tilt about the shaft 13. When the body 1 has tilted sufficiently to cause the eye 20 to pass below the level of the bolster 18, the engagement of the chain 19 therewith will cause a pull to be exerted on the bell crank 21, thereby lifting the rearward arm of said bell crank 21 and causing the finger 31 to disengage the bar 23, thus permitting the end gate 22 to swing open rearwardly at the bottom about the pin 32 attached to the upper portion of the end gate 22, said pin being inserted in the eye of the link 33, said link 33 being fixed in position relative to the body 1 where the eye of said link 33 is placed over the pin 29 and held on said pin by the key 28 so that the free end of said link 33 rests on the outwardly turned end of the strap 26 as shown. The end gate 22 is free to move upward to avoid obstructions if necessary, being restrained in its movement by the link 33 rotating upwardly about the pin 29.

When the operator desires to return the body 1 to its normal position, the forward end of the body 1 is pulled down to said normal position, whereupon it is latched in position substantially in the reverse manner to the manner of unlatching heretofore described. The bar 23 on the end gate 22 engages the rounded nose of the bell crank 21, causing the said bell crank to rotate about the pin 36, thus permitting the finger 31 to slip over the bar 23, latching the end gate 22 in place between the said bell crank 21 and the fingers 25 as heretofore described. In order to ensure the continued engagement of the finger 31 with the bar 23, the spring 34 is attached at one end to the front arm of the bell crank 21, the other end of the spring 34 being attached to the body 1 by means of the eye 35.

When it is desired that the end gate 22 should swing open rearwardly at the top, the key 28 is removed from the hole 30, when the link 33 is removed from the pin 29 and placed on the outwardly turned end of the strap 26 and held in place by inserting the key 28 in the hole 27. The link 33 is constructed of such length that the end gate 22 will be positioned flush with the floor of the body 1, when opened the lower end of said end gate 22 being restrained in rotation by the bell crank 21 and the fingers 25 engaging the bar 23 and causing the end gate 22 to rotate substantially about the said bar 23.

In carrying my invention into effect, the mechanism heretofore described is to be duplicated at opposite sides of the body and frame, except the shafts and bolsters heretofore mentioned, which extend transversely to said body and frame.

For convenience in description and illustration, I have shown the invention carried forth with a bed and body of wood. However, it is obvious that the invention is not limited in practice to such materials, but may also be used on a steel body and frame or a combination thereof.

I claim:

In a gravity tilting body, a bolster positioned on a frame below the normal position of the body, a chain positioned on said body and engaging said bolster when the said body is in the tilted position, a bell crank connected to said chain, a spring to restrain said bell crank, a finger on said bell crank, an end gate on said body carrying on its lower edge a bar to engage said finger, fingers on said body to restrain said bar against said bell crank, an eye on the upper part of said end gate, a rod having a hook at one end to engage said eye and an eye at the other end of said rod, a strap on said body having an outwardly turned portion whereon said rod may rest, and a pin positioned on said body to receive said eye on said rod.

In testimony whereof I affix my signature.

FRANK J. MELTON.